Dec. 28, 1965  S. EPSTEIN  3,226,135
TRIPLE WALLED VENT PIPE
Filed Oct. 31, 1962  2 Sheets-Sheet 1

INVENTOR.
SAUL EPSTEIN
BY
ATTORNEY

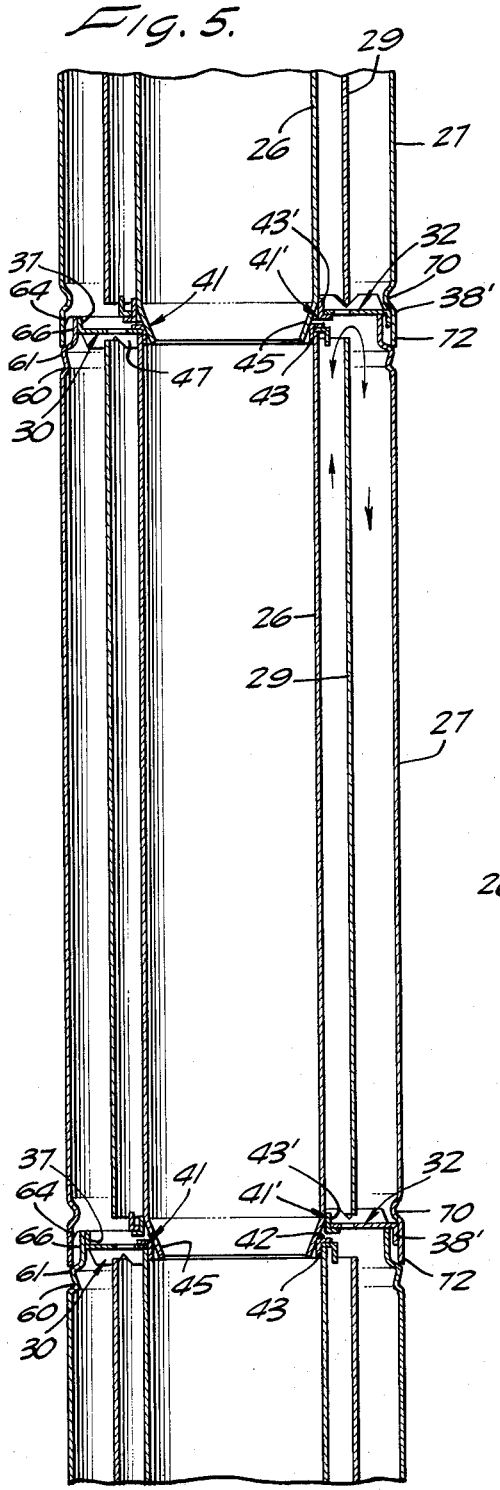
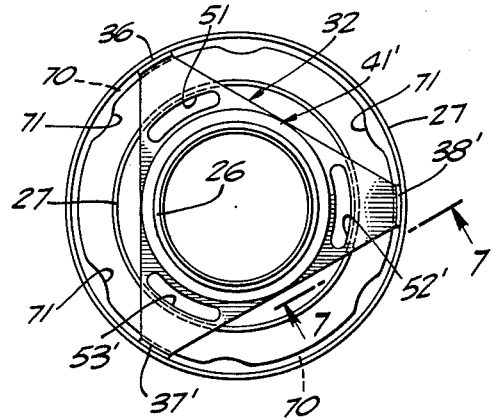
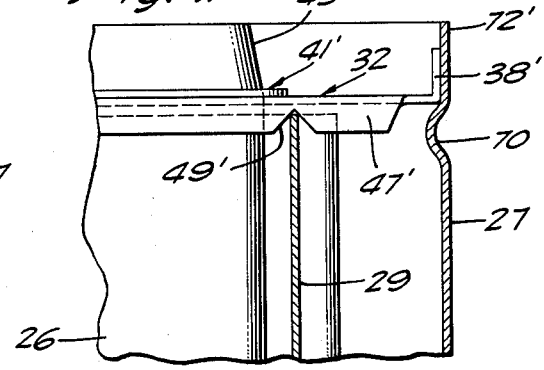
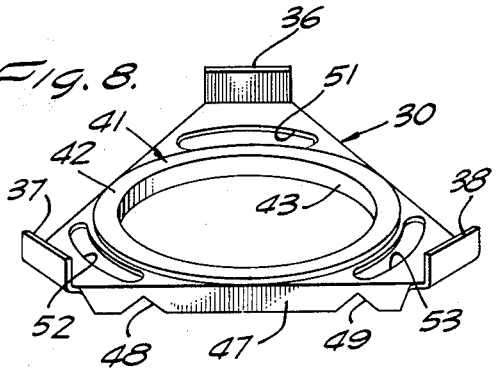
INVENTOR.
SAUL EPSTEIN

United States Patent Office 3,226,135
Patented Dec. 28, 1965

3,226,135
TRIPLE WALLED VENT PIPE
Saul Epstein, 2332 Nottingham Ave.,
Los Angeles 27, Calif.
Filed Oct. 31, 1962, Ser. No. 234,489
4 Claims. (Cl. 285—41)

This invention relates to pipe construction for use with gaseous liquid or solid fuel heating appliances including domestic incinerators and low heat industrial appliances which produce flue-gas temperatures generally of not more than 1000° F. under normal operation and not more than 1400° F. during brief and infrequent periods of forced firing. The temperatures may run to not more than 1700° F. during shorter and infrequent periods of firing under brief burn-out conditions. More particularly, it is an object of the invention to provide a vent pipe of this type which is a triple walled pipe having particular characteristics such that it has appropriate insulating qualities, and is suitable from every standpoint for its particular usage and application. The particular construction is one which must meet the Underwriters Laboratories' Standards for safety for it to be successful. The said standards for safety are the test standards to be met for listing by the Underwriters Laboratories.

These vent pipes must provide for insulation against transfer of heat from hot combustion gases conveyed through the inner pipe, to the exterior pipe wall and thence to adjacent combustible materials.

An object of the invention is to provide for favorable insulating qualities in order to meet the requirements and to accomplish this in a simplified, effective and appropriately economical way and furthermore in a structure that is easy rather than difficult to fabricate.

Another object is to make available a construction whereby it is possible to arrive at a better balancing temperature, i.e., that the temperatures at the top and bottom do not depart from each other as much, that is that they are more uniform. The problem solved is in part the fact that it has been found in the prior art that the temperature at the bottom of the pipe may be safe by a margin of 60 to 70° whereas it is too hot at the top and this deficiency is met by this invention by creating a greater uniformity of temperatures along the length of the pipe.

In the prior art there are known vent pipes of multiple wall construction, wherein there is provided a thermo-syphonic flow calculated to assist in keeping the pipe cool. In this type of construction there is an upward circulation of air between two inner walls and a downward circulation of cooler outside air between an outer wall and an intermediate wall, the circulation being thermo-syphonic. This system is good for a height of approximately 26′ to 30′.

Utilizing the concept and adaptation of this invention, it has been made possible to utilize this thermo-syphonic principle in an improved way in triple walled pipe, wherein the space between the inner wall and intermediate wall and between the intermediate wall and outer wall are in communication at spaced points. In this way, it has been made possible to construct a pipe of this type consisting of only three walls which provides the necessary insulation qualities, and is in all respects able to meet the requirements imposed and is still capable of economical and satisfactory fabrication. The accomplishment of these ends constitutes further objects of the invention.

Preferably the pipe of this invention is made in unitary sections which are joined or assembled lengthwise to provide the necessary run or length of pipe. The actual joints between sections may be of a known type. Transverse spacer plates or members are used adjacent each end of the sections which have several purposes. They provide for structural firmness and rigidity and they are also of a shape having opeings providing for thermo-syphonic circulation throughout the length of the pipe, and also thermo-syphonic circulation with respect to each section of pipe as will be described in detail hereinafter.

A particular object of the invention is to provide transverse spacer plates or members having particular shapes and configuration as described hereinafter which have been found to produce optimum results in the pipe from the standpoint of improved insulating qualities related to a thermo-syphonic effect.

Further objects and numerous additional advantages will become apparent from the following detailed description and annexed drawings, wherein:

FIGURE 5 is a sectional view showing pipe sections in assembled relationships;

FIGURE 6 is a bottom end view of the pipe section of FIGURE 4;

FIGURE 7 is a sectional view taken along line 7—7 of FIGURE 6;

FIGURE 8 is a perspective view of a preferred form of spacer plate.

Referring now more in detail to the drawings, 10 shows diagrammatically part of a building having a roof 11 and a chimney 12. Numeral 14 designates a run of triple walled pipe sections joined together to provide for venting of a furnace as shown at 16 and a water heater, for example, 17 connected to the length of the pipe by ducts shown at 20 and 21.

Figure 1:
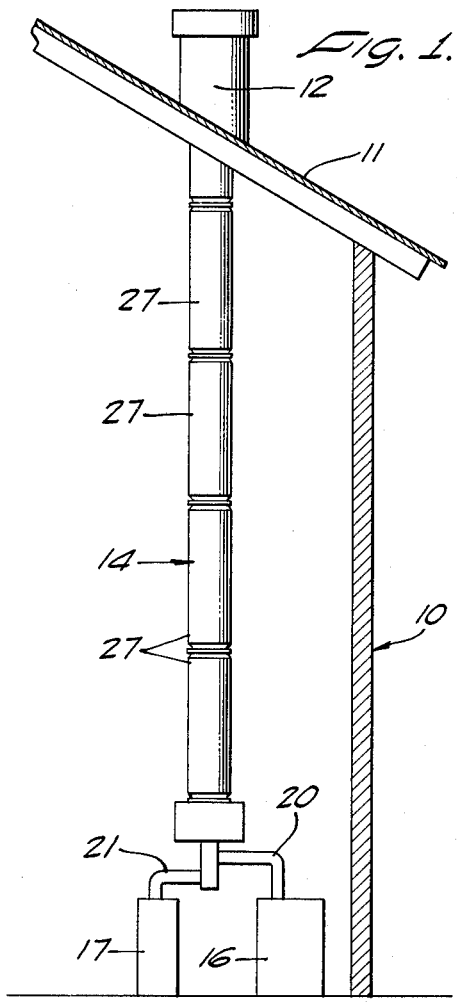
FIGURE 1 is a diagrammatic view of an installation using pipe sections of this invention.
Figure 2:
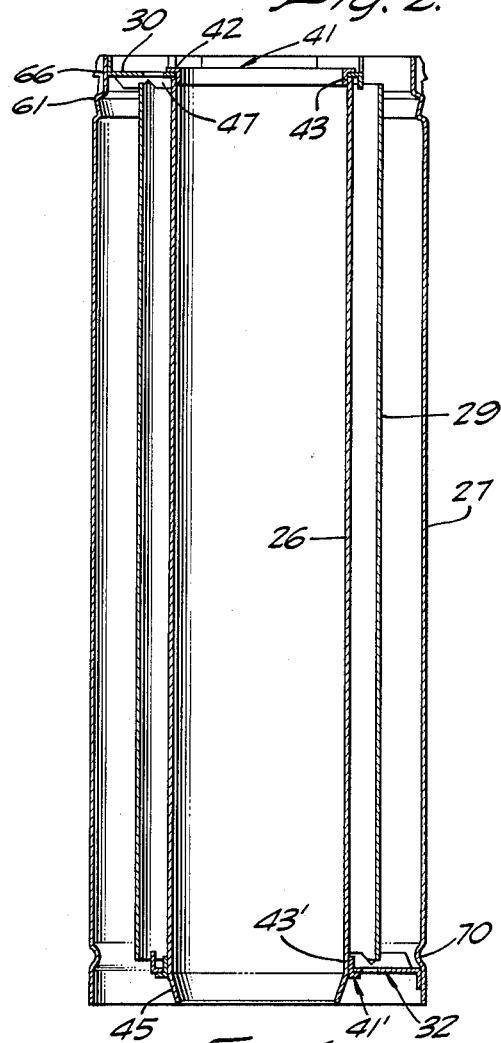
FIGURE 2 is a sectional view of one of the triple walled pipe sections.

FIGURE 2 shows in cross-section one of the triple walled pipe sections of the invention. These pipe sections may be fabricated in various sizes; particular sizes that have been built are those 6″, 7″ and 8″ in diameter with the relative spacings being approximately that as shown in the figures.

Each triple walled section has an inner cylindrical pipe section 26, an outer cylindrical section or wall 27 and an intermediate section or wall 29 spaced as shown. Each individual section of the triple walled structure has a male end and a female end. In FIGURE 2 the male end is at the top and the female end at the bottom. The joint between sections preferably is of a type providing for easy joining and assembly of sections and easy disassembling as desired. These joints between sections may be of the type shown in the patent of Saul Epstein, No. 2,936,184 or they may be of other types. The construction of the actual joints is shown somewhat diagrammatically herein, and as stated, other types of joints may be used. The invention herein is primarily concerned with the triple walled construction providing a pipe as referred to in the foregoing having the desired insulative qualities brought about by the thermo-syphonic effect as will be described.

Each pipe section as shown in FIGURE 2 has adjacent each end a transverse member or spacer plate preferably having a configuration as shown at 30 in FIGURE 8. These plates are designated at 30 in FIGURE 2 at the top, and 32 at the bottom of the section shown. These transverse members preferably have a configuration as shown in FIGURE 8 although the configuration may depart somewhat from this shape. They provide for holding the walls in spaced relationship and for rigidity in construction. Additionally, however, they are configurated and apertured to provide for a thermo-syphonic flow or effect of the air which is enclosed between the walls of the pipe as will be be described more in detail presently.

The member 30 in FIGURE 8 is generally triangular having extending flanges or tabs as designated at 36, 37 and 38 extending in a plane normal to a plane of the member. The member has a central circular opening and fitting in this opening is a ring member 41 having a flange part 42 which may be attached to the plate 30 by rivets or the like and a downwardly extending skirt 43, which is of a diameter to fit inside of the inner section 26 at the male end. At the female end this ring is identified by numeral 41' and its skirt 43' (FIGURE 2) fits around the inner pipe section 26. At the female end the inner pipe section 26 has an end section which is longitudinally ribbed as designated at 45. Member 30 may have other shapes, the significant feature of the construction being the openings allowing air circulation. Alternatively also, the member 30 may have a one-piece construction. Also pipe section 26 at the female end may have an annular bead to hold the pipe tightly between the upper and lower spacers.

Figure 3:
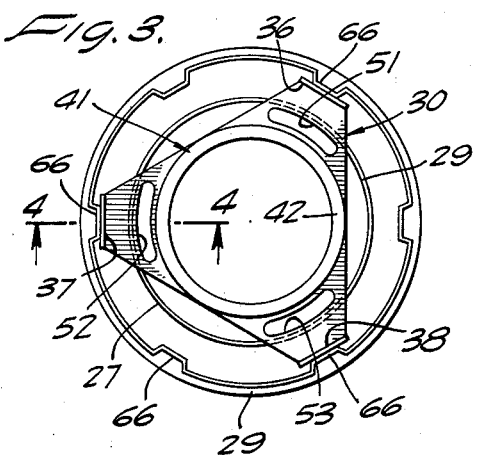
FIGURE 3 is a top end view of the pipe section of FIGURE 2.
Figure 4:
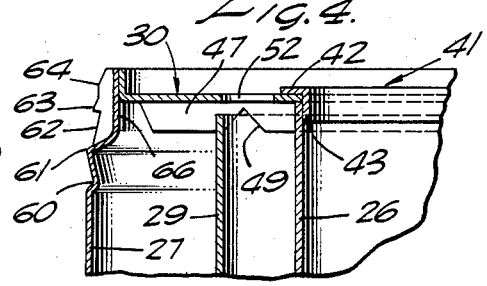
FIGURE 4 is a sectional view taken along line 4—4 of FIG. 3.

The plate 30 also has downwardly extending side flanges as designated at 47, each of which has two angular slots or cutouts as shown at 48 and 49. Each of the plates 30 also has arcuate openings as designated at 51, 52 and 53 for a purpose which will be presently pointed out. FIGURE 3 shows the manner of assembly of the plate or transverse member 30 with respect to the cylindrical pipe sections. FIGURE 4 is an enlarged view of a part of the male end of the pipe section. It will be seen that the pipe section has an annular groove 60; a rib 61; an inwardly tapering part 62; another annular rib 63 and a further inwardly tapering part 64. At the end of the section there are also provided a plurality of equal angularly spaced inwardly extending embossments 66 as may be seen in the figures. The plate 30 is assembled as may be seen in FIGURES 2, 3 and 4 with plate 30 slightly inward from the end of the outer section 27. The skirt 43 extends into the interior of the inner pipe section 26, with the plate 30 resting on the end of pipe section 27. The angular openings or slots 48 and 49 in each of the depending flanges as shown at 47 fit over top edges of intermediate pipe section 29, as may be seen in FIGURE 4. The upwardly extending tabs or flanges 36, 37 and 38 bear against three of the inwardly extending bosses 66 and they are suitably attached thereto for example as being riveted thereto.

FIGURES 6 and 7 illustrate the assembly of the transverse member or plate 32 at the female end of the section. The plate 32 is spaced inwardly from the end of the section and is adjacent to an inwardly embossed annular groove 70 formed in the outer wall section 27 and spaced from an end. At this end the flanges or tabs 36', 37' and 38' are at a radial distance from the center to be flush against the inside of the section 27 and are suitably secured thereto, such as for example, as being riveted. Numeral 71 designates a group of equally angularly spaced additional boss formations or embossments which are embossed in from the annular ring or depression 70 and extend inwardly slightly further for purposes of additional strengthening and stiffening. At the female end the ring member 41' fits around the outside of the inner pipe section 26 which is tapered and longitudinally ribbed at the end as designated at 45.

FIGURE 5 shows sections of the triple walled pipe joined together. From the foregoing description, those skilled in the art will observe that the transverse member 30 at the male end is spaced from the end, and by reason of its configuration and the openings in it provides for communication of air between the spaces between the intermediate pipe 29, and the inner pipe 26 and between the outer pipe 27 and the intermediate pipe 29.

Similarly, the spacer plate 32 is spaced from the female end of the pipe section and its configuration and apertures also provide for similar type of communication as just described.

FIGURE 5 shows the relationship between the plates or transverse members 30 and 32 in the assembled structure, in which sections of the triple walled pipe are joined. As pointed out in the foregoing, the joint itself may be of the type shown in detail in the patent of Epstein, No. 2,936,184. As may be seen in FIGURE 5, the skirt 43 on the ring member 41 in plate 30, receives the tapered longitudinally ribbed end 45 of the inner pipe 26. The end 72 of the female end section fits around the tapered end 64 of the male end of the other section with the joint being secured as described in the foregoing. As may be seen therefore the joint leaves a spacing between the ends of the intermediate pipe 29 in the two sections. The plates 30 and 32 are spaced apart from each other a relatively small amount shown in FIGURE 5. It has been discovered that this particular construction and arrangement, induces a thermo-syphonic circulation which has the effects and results as described in the foregoing of improving the insulating properties and of improving and making more uniform the temperature distribution or variation in a desirable and sought for manner. Thermo-syphonic circulation takes place throughout the entire length of the run of pipe as shown at 14 in FIGUE 1. The spaces between walls 27 and 29 and 26 and 29 are open to atmosphere at the top.

There is also a secondary thermo-syphonic circulation with respect to individual sections of the conduit as indicated by the arrows in FIGURE 5. These effects result from the particular construction at the joints and the configuration and aperturing of the plates 30 and 32. While providing for rigidity, these plates are of a shape and spacing to provide adequate openings for the desired circulation, both the main thermo-syphonic circulation and the secondary circulation. The apertures 51, 52 and 53, and 51', 52' and 53' provide open areas at sides of spacers 30 and 32 and allow the air to circulate from between the inner pipe and the intermediate pipe and to flow in thermo-syphonic circulation, which is otherwise permitted, due to the particular shape of the plates 30 and 32, which does not obstruct the openings at the ends of the spaces between the intermediate pipes 29 and the inner pipes 26. The secondary thermo-syphonic circulation has been found to improve the heat insulation qualities by assisting in the carrying away of the heat.

From the foregoing those skilled in the art will observe that the invention achieves and realizes all of the objects as stated in the foregoing, and the advantages enumerated. The concept of the invention and its implementation makes possible a pipe of the type described which is triple walled and has the appropriate insulation characteristics to meet the necessary requirements, and is fully adaptable for its purposes.

The foregoing disclosure is representative of a preferred form of the invention and is to be interpreted in an illustrative rather than a limiting sense, the invention to be accorded the full scope of the claims appended hereto.

What is claimed is:

1. A triple wall vent pipe section, comprising, in combination: an inner pipe; an outer pipe disposed about said inner pipe and spaced therefrom, the opposite ends of said inner and outer pipes having means thereon for making joints with mating means provided on the ends of the inner and outer pipes of other like constructed sections; an intermediate pipe disposed between and spaced from said inner and outer pipes, said intermediate pipe being shorter than said inner and outer pipes and having its opposite ends spaced inwardly from the corresponding ends of said inner and outer pipes so that when said section is assembled in flow relationship with other like constructed sections also having intermediate pipes, the confronting ends of the intermediate pipes of the assembled sections will be spaced apart; and spacer means at each end of said intermediate pipe for holding all three of said pipes in spaced relationship, each of said spacer means comprising: a generally equilateral triangular plate extending transversely of said section between said inner and outer pipes and having a central opening therein, the sides of said generally triangular plate passing radially inwardly of the inner periphery of the intermediate pipe and radially outwardly of the inner pipe, whereby fluid flow communication is established between said inner and outer pipes and a through flow path is established through said inner pipe independent of and unmixed with fluid flow between said inner and outer pipe; ring-like means carried by said plate about said central opening and engaging the wall of said inner pipe for connecting said plate thereto; means on each corner of said plate engaged with said outer pipe for connecting said plate thereto; and axially extending spacing means on said plate outwardly of said central opening in engagement with the associated end of said intermediate pipe to provide for fluid flow between the said spaces defined by said inner pipe, the cross-sectional areas of the inner flow space between said inner pipe and said intermediate pipe, and of the outer flow space between said intermediate pipe and said outer pipe, both being substantially greater than the areas of the portions of said generally triangular plate extending transversely across said inner and outer flow spaces, whereby to provide communication between said inner and outer flow spaces of said section.

2. A triple wall vent pipe section as recited in claim 1, wherein said axially extending spacing means on said plate in engagement with the associated end of said intermediate pipe comprises a plurality of spaced, axially projecting flanges on the underside of said plate, each of said flanges having a notch therein within which is engaged the associated end of said intermediate pipe.

3. A triple wall vent pipe section as recited in claim 1, wherein said inner pipe includes male and female end portions, said male end portion being frusto-conical and projecting beyond the transverse plate associated therewith, the ring-like means associated with said female end portion of said inner pipe having a skirt portion received within said female pipe end, and the ring-like means associated with said male pipe end portion having a skirt portion embracing the outer surface thereof inwardly from the outer end of said frusto-conical portion.

4. A triple wall vent pipe as recited in claim 1, wherein the portion of said generally triangular plate extending transversely across said inner space has a plurality of openings therethrough.

References Cited by the Examiner

UNITED STATES PATENTS

| 1,085,303 | 1/1914 | Scherer | 285—424 |
| 1,757,479 | 5/1930 | Schmidt | 138—148 X |
| 2,423,989 | 7/1947 | Lathrope | 138—113 X |
| 2,679,867 | 6/1954 | Epstein | 285—424 |
| 2,714,395 | 8/1955 | Epstein | 285—138 |
| 2,841,203 | 7/1958 | Gronemeyer | 138—148 X |
| 2,894,537 | 7/1959 | Carr | 285—424 |
| 2,914,090 | 11/1959 | Isenberg | 138—113 |
| 2,959,196 | 11/1960 | Truesdell | 285—424 |
| 2,962,053 | 11/1960 | Epstein | 138—113 |
| 3,146,005 | 8/1964 | Peyton | 285—133 X |

FOREIGN PATENTS

| 1,299,339 | 7/1962 | France. |
| 645,876 | 6/1937 | Germany. |

CARL W. TOMLIN, *Primary Examiner.*